US012705528B2

(12) United States Patent
Gaddam et al.

(10) Patent No.: US 12,705,528 B2
(45) Date of Patent: Aug. 11, 2026

(54) MODEL SHIFT PREVENTION THROUGH MACHINE LEARNING

(71) Applicant: Visa International Service Association, San Francisco, CA (US)

(72) Inventors: Ajit Gaddam, Foster City, CA (US); Ara Jermakyan, Northridge, CA (US); Pushkar Joglekar, Emeryville, CA (US)

(73) Assignee: Visa International Service Association, San Francisco, CA (US)

( * ) Notice: Subject to any disclaimer, the term of this patent is extended or adjusted under 35 U.S.C. 154(b) by 1161 days.

(21) Appl. No.: 17/269,194

(22) PCT Filed: Aug. 23, 2018

(86) PCT No.: PCT/US2018/047804

§ 371 (c)(1),
(2) Date: Feb. 17, 2021

(87) PCT Pub. No.: WO2020/040777

PCT Pub. Date: Feb. 27, 2020

(65) Prior Publication Data

US 2021/0209512 A1 Jul. 8, 2021

(51) Int. Cl.

*G06N 20/00* (2019.01)
*G06F 21/56* (2013.01)
*G06N 5/04* (2023.01)

(52) U.S. Cl.

CPC ............ *G06N 20/00* (2019.01); *G06F 21/56* (2013.01); *G06N 5/04* (2013.01); *G06F 2221/031* (2013.01)

(58) Field of Classification Search

CPC ...................................................... G06N 20/20
See application file for complete search history.

(56) References Cited

U.S. PATENT DOCUMENTS 8,682,812 B1 * 3/2014 Ranjan .................. H04L 43/028 706/12
9,888,030 B2 * 2/2018 Yao ....................... G06F 21/566
(Continued)

OTHER PUBLICATIONS

M. Mozaffari-Kermani, S. Sur-Kolay, A. Raghunathan and N. K. Jha, “Systematic Poisoning Attacks on and Defenses for Machine Learning in Healthcare,” in IEEE Journal of Biomedical and Health Informatics, vol. 19, No. 6, pp. 1893-1905, Nov. 2015 (Year: 2015).*

(Continued)

*Primary Examiner* — Omar F Fernandez Rivas
*Assistant Examiner* — Chaitanya R Jayakumar
(74) *Attorney, Agent, or Firm* — Kilpatrick Townsend & Stockton LLP

(57) ABSTRACT

Methods and systems for detecting and correcting model shift in machine learning models are disclosed. A computer can receive a set of input data from a data source. The computer can apply the input data to a machine learning model to produce a first set of classification data. The computer can perform a metadata test and validate the current machine learning model and the set of input data using a plurality of previously generated machine learning models. The plurality of previously generated machine learning models can produce a plurality of sets of classification data, which can be compared to the first set of classification data. Based on the comparison, the computer can determine whether the set of input data is associated with a malicious entity.

11 Claims, 8 Drawing Sheets

(56) References Cited

U.S. PATENT DOCUMENTS

| | | | | |
|---|---|---|---|---|
| 10,438,212 | B1 * | 10/2019 | Jilani | G06N 5/025 |
| 2007/0006305 | A1 | 1/2007 | Florencio et al. | |
| 2011/0320816 | A1 | 12/2011 | Yao et al. | |
| 2012/0158626 | A1 | 6/2012 | Zhu et al. | |
| 2015/0172300 | A1 | 6/2015 | Cochenour | |
| 2015/0242760 | A1 * | 8/2015 | Miao | H04L 67/306 706/12 |
| 2015/0254555 | A1 | 9/2015 | Williams, Jr. et al. | |
| 2018/0025286 | A1 * | 1/2018 | Gorelik | G06F 30/20 706/12 |
| 2018/0287856 | A1 * | 10/2018 | Whitner | H04L 41/12 |
| 2019/0018956 | A1 * | 1/2019 | Sadaghiani | G06N 5/01 |
| 2019/0318099 | A1 * | 10/2019 | Carvalho | G06F 21/577 |
| 2019/0362072 | A1 * | 11/2019 | Kesarwani | G06F 21/552 |

OTHER PUBLICATIONS

Lin, Shih-Wei, et al. "Parameter determination and feature selection for back-propagation network by particle swarm optimization." Knowledge and Information Systems 21 (2009): 249-266. (Year: 2009).*

Orij, J. E. L. T. E. Self-adaptation to concept drift in web-based anomaly detection. MS thesis. University of Twente, 2016. (Year: 2016).*

Lee, Wenke, Salvatore J. Stolfo, and Kui W. Mok. "Adaptive intrusion detection: A data mining approach." Artificial Intelligence Review 14.6 (2000): 533-567. (Year: 2000).*

Application No. PCT/US2018/047804 , International Search Report and Written Opinion, Mailed On May 20, 2019, 11 pages.

* cited by examiner

MODEL SHIFT PREVENTION THROUGH MACHINE LEARNING

This application is a National Stage of International Application No. PCT/US2018/047804 filed Aug. 23, 2018, of which is herein incorporated by in its entirety.

BACKGROUND

As machine learning systems have become more robust, efficient, and accurate, machine learning has been applied to an increasing number of academic, industrial, and security applications. In particular, machine learning classifiers have found increasing use in automating complex processes that require careful decision making.

A machine learning classifier is a type of machine learning model that learns to differentiate between input data belonging to multiple classes. For example, a machine learning classifier can be used to differentiate between real news articles and fake news articles, legitimate emails and spam emails, or aerial photographs of military and civilian installations. During a training phase, machine learning classifiers can learn to recognize patterns in labeled training data. Later, during production, the machine learning classifier can use these recognized patterns in order to produce classification data corresponding to the input data, for example, classifying a news article (input data) as fake news (classification data).

However, machine learning classifier systems can be vulnerable to exploitation by malicious entities (e.g., hackers). By influencing the training data set, a malicious entity can potentially influence classification data produced by a machine learning classifier. The resulting "model shift" can be used by the malicious entity in order to achieve some desired purpose, such as publishing fake news articles to a social network, or getting spam emails or viruses past a machine learning email filter, among others. This vulnerability to exploitation by malicious entities is a security problem for conventional machine learning classifier systems.

Embodiments of the invention address this problem and other problems individually and collectively.

SUMMARY

Embodiments of the invention are directed to methods and systems for detecting and correcting model shift in machine learning models, as well as identifying malicious entities that may be attempting to induce model shift in the machine learning models. Thus, embodiments of the invention address security problems associated with conventional machine learning models. Model shift may refer to a process where a machine learning model changes over time as a result of new training data being included in the training data set. As an example, model shift in a machine learning classifier may manifest as a change in the classifications produced by the machine learning classifier, such as a news classifier classifying a news article as "fake news," but classifying the same news article as "real news" at a later date.

Methods according to embodiments of the invention may be performed by a computer. The computer can detect model shift in a current machine learning model by using a metadata test or by comparing classification data across a plurality of previously generated machine learning models. Additionally, the computer can determine whether a malicious entity is responsible for the shift. Further, the computer can retrain the current machine learning model to correct any model shift induced by the malicious entity.

One embodiment is directed to a method comprising: receiving, by a computer, a set of input data; applying, by the computer, the set of input data to a current machine learning model; producing, by the computer, a first set of classification data; applying, by the computer, the set of input data to a plurality of previously generated machine learning models; and analyzing, by the computer, the first set of classification data and the plurality of sets of classification data to determine if the set of input data is associated with a malicious entity.

Another embodiment is directed to a computer comprising: a processor; and a non-transitory computer readable medium coupled to the processor, the non-transitory computer readable medium comprising code, executable by the processor, for implementing the above-noted method.

Prior to describing specific embodiments of the invention, some terms may be described in detail.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

In embodiments of the invention, a "computer" may evaluate input data using a machine learning model, for example, using machine learning to classify news articles as real or fake news, producing classification data in the process. Additionally, the computer may evaluate classification data and act based on the evaluation. For example, a computer used to classify news articles may block or otherwise prevent fake news articles from being published on a social network. As another example, the computer may have the ability to revoke entity credentials in order to deny a malicious entity access to the computer or other systems.

The computer may train, store, and manage machine learning models, including a current machine learning model and a plurality of previously generated machine learning models. These machine learning models may be stored in a model cache or database managed by the computer. The computer may train the machine learning models using labeled or unlabeled training data, including feature vectors stored in a "feature store" or other appropriate feature vector database. Moreover, the computer may incrementally or continually train or retrain the current machine learning model using input data and classification data produced by the current machine learning model.

The computer may additionally evaluate machine learning models on their performance and for the purpose of detecting model shift. For example, the computer may evaluate a plurality of machine learning models using a validation data set. The machine learning model that performs the best (e.g., produces the lowest error score), may be used by the computer as the current machine learning model to evaluate input data produced by data sources. The computer may evaluate the current machine learning model using tests such as a metadata test in order to determine if model shift has occurred. Additionally, the computer may determine if model shift has occurred by comparing the classification produced by the current machine learning model to classifications produced by the plurality of previously generated machine learning models. If the computer determines model shift has occurred, the computer may retrain the currently generated machine learning model.

"Entities" may include things with distinct and independent existence. For example entities may include people, organizations (e.g., partnerships and businesses), computers, and computer networks, among others. An entity can communicate or interact with its environment in some manner. Further, an entity can operate, interface, or interact with a computer or computer network during the course of its existence. An entity may be a "data source," an entity that provides input data to a computer or another entity during the course of its existence. An entity may be a malicious entity that intends to induce model shift in a machine learning model or otherwise compromise a machine learning model in order to achieve some desired goal. For example, the malicious entity may attempt to induce model shift in order to get spam emails (generated by the malicious entity) past a machine learning based email filter.

An "entity credential" may include something that indicates an entity's privileges or entitlement. These privileges may include allowing the entity to transmit input data to a computer and receive classification data produced by the computer. A credential may comprise an alphanumeric sequence or sequences that an entity can present in order to be authenticated. For example, an entity credential may comprise a username and password, or an Application Programming Interface (API) key used to access an API. An entity credential may be verified by a computer before the computer accepts input data from that entity. In some embodiments, the computer or a computer system associated with the computer may issue, manage, and revoke entity credentials. As an example, if a computer determines that an entity is malicious, the computer may revoke the entity credential associated with that entity, in order to deny that entity access to its privileges or entitlements.

An "entity profile" may include a profile or collection of data about an entity. For example, an entity profile for a human user could comprise information including a user identifier (such as a name), a user's home or work address, the user's age, the user's acquaintances, etc. The information comprising an entity profile can be used to uniquely identify the entity associated with the entity profile. Entity profiles can be represented electronically and can be stored in an "entity profile database" or another suitable data structure. In some embodiments, there may be a machine learning model corresponding to each entity. The machine learning model corresponding to an entity may be electronically stored in association with the entity profile corresponding to that entity. Additionally, a computer or another suitable system can use the entity profile in order to identify and retrieve that machine learning model corresponding to that entity. The machine learning model can be used by the computer in order to evaluate input data received from that entity.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, models that classify data by establishing a gap or boundary between inputs of different classifications, as well as neural networks, collections of artificial "neurons" that perform functions by activating in response to inputs.

A "model cache" may include a database that can store machine learning models. Machine learning models can be stored in a model cache in a variety of forms, such as collections of parameters or other values defining the machine learning model. Models stored in a model cache may be stored in association with entity profiles, such that each model in the model cache corresponds to a specific entity profile. Models in a model cache may also be stored in association with keywords that communicate some aspect of the model. For example, a model used to evaluate news articles may be stored in a model cache in association with the keywords "news," "propaganda," and "information." A computer can access a model cache and retrieve models from the model cache, modify models in the model cache, delete models from the model cache, or add new models to the model cache. Additionally, computers can modify any association between models and entity profiles, keywords, or the like.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex "input," such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

A "machine learning classifier" may include a machine learning model that can classify input data or feature vectors. For example, an image classifier is a machine learning model that can be used to classify images, such as images of animals. As another example, a news classifier is a machine learning model that can classify news articles as "real news" or "fake news." As a third example, an anomaly detector, such as a credit card fraud detector, can classify input data such as credit card transactions as either normal or anomalous. The output produced by a machine learning classifier may be referred to as "classification data." Machine learning classifiers may also include clustering models, such as K-means clustering. Clustering models can be used to partition input data or feature vectors in to multiple clusters. Each cluster may correspond to a particular classification. For example, a clustering model may accept feature vectors corresponding to the size and weight of dogs, then generate clusters of feature vectors corresponding to small dogs, medium dogs, and large dogs. When new input data is included in a cluster (e.g., the small dogs cluster), the clustering model has effectively classified the new input data as input data corresponding to the cluster.

"Classification data" may include any data related to the classification of input data, feature vectors, objects, entities, etc. Classification data may be produced by a machine learning classifier, retrieved from a database, produced by a subject matter expert, or retrieved from any other appropriate source. Classification data may be probabilistic and may be mapped to a defined range, e.g., a news classifier may produce a score of "0" to indicate fake news, a score of "100" to indicate real news, and a score in between 0 and 100 to indicate some probability of real or fake news (such as a score of 80 to indicate an 80% chance that the news article is real news).

An "anomaly score" may refer to a score that indicates how normal or anomalous something is. For example, an anomaly score can indicate how anomalous a set of input data is. In some embodiments, classification data produced by the machine learning model may be an anomaly score. An anomaly score can be within a defined range, such as $0\rightarrow1$, $-1\rightarrow1$, or $0\rightarrow100$. An anomaly score can be compared against a threshold in order to make a decision. For example, if an anomaly score exceeds a threshold, a computer can revoke an entity credential associated with the entity or data source that produced the corresponding input data.

"Model shift" may refer to a change in the properties of a machine learning model, such as a change in a machine learning model over time. Model shift may include a change in how a machine learning model classifies or responds to input data. For example, a machine learning classifier may classify news articles as real news or fake news, and model shift may correspond to a change in how the classifier classifies news articles, e.g., a change in a classification of a particular news article from fake news to real news. Model shift may be the result of changes in input data or the discovery of new information. In some cases, model shift may be induced by a malicious entity in order to achieve some desired end. For example, a propagandist may attempt to induce model shift in a machine learning classifier that classifies news as real or fake, in order to pass fake news as real news.

"Transition data" may include input data used to induce model shift in a machine learning model. Transition data may be generated by a data source, such as a malicious entity that generates transition data in order to compromise the machine learning model. For example, a propagandist may generate transition data in order to prevent a news classifier from differentiating between real news and fake news. Transition data may be generated such that it shares characteristics of data belonging to two different classifications. For example, a news article that is largely true but contains deliberate errors.

"Metadata" may include data that provides information about other data. Types of metadata include descriptive metadata, structural metadata, administrative metadata, reference metadata and statistical metadata. Metadata may correspond to a machine learning model or properties of the machine learning model. For example, metadata for a support vector machine may include the equation for the boundary hyperplane. Metadata may also correspond to a data set, such as a training data set or input data set, such as the distance between clusters of data points. A computer may compare different metadata in order to determine whether model shift has occurred. For example, if the Euclidean distance between two clusters of data points has changed, model shift may have occurred.

DETAILED DESCRIPTION

Figure 1:
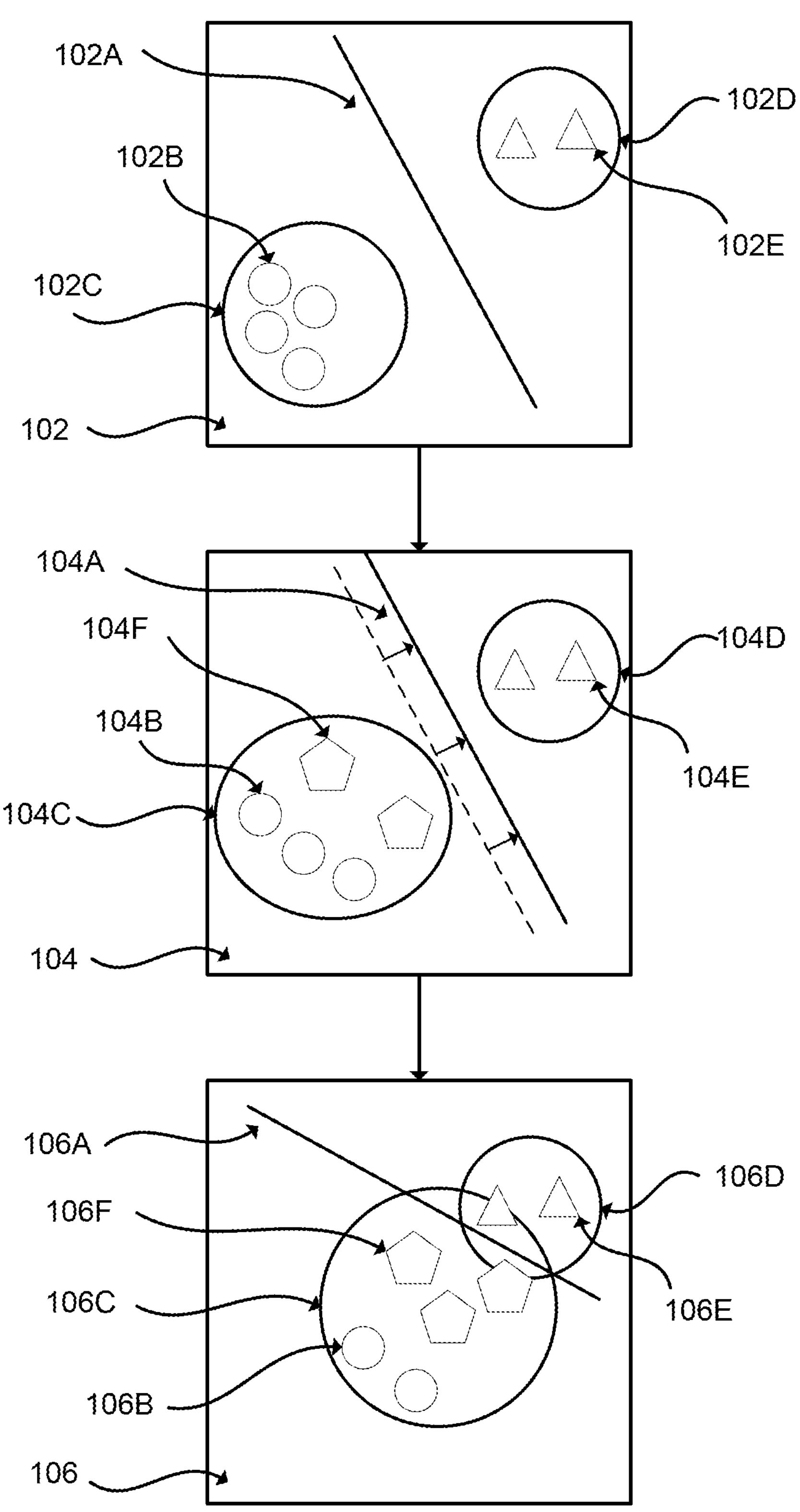
FIG. 1 shows an exemplary support vector machine state transition diagram according to some embodiments of the invention.

The following paragraphs introduce some concepts that may be helpful in understanding embodiments of the invention, model shift, and improvements over conventional machine learning models and systems. An example of model shift is presented in with reference to a simplified support vector machine in FIG. 1. Following this introduction, methods and systems according to embodiments will be described in greater detail with reference to FIGS. 2-7.

As described above, model shift can comprise a change in the output of a machine learning model (such as a machine learning classifier) over time. While embodiments of the invention are directed to methods and systems for detecting and correcting model shift, model shift itself is not always an undesirable outcome. To elaborate, a machine learning model that is capable of model shift is capable of adapting to a changing environment, a characteristic that is helpful in a number of machine learning applications. For an exemplary application such as news classification, the characteristics of real and fake news may change over time (e.g., news articles published during an election year may be different than news articles published before the election year). A news classifier that can shift to account for these changes will generally outperform similar news classifiers that are unable to shift.

Self-learning is one method of achieving desirable model shift. A self-learning model can use its own classifications of input data as training data. This allows the model to continue to adapt to changes in input data over time. Moreover, self-learning is convenient and labor saving, as subject matter experts don't need to label new input data before it is used to train the model.

However, self-learning systems are vulnerable to deliberate attempts to influence the system via controlled input data, i.e., transition data. A malicious entity can generate transition data that can be provided to the machine learning model with the intent of causing model shift. This model shift affects the machine learning model's ability to produce accurate outputs, such as classification of input data. As an example, a malicious entity can use transition data to induce a model shift in a news classifier, in order to prevent the news classifier from accurately detecting and classifying fake news.

In an exemplary application for machine learning, a social network may use a news classifier to prevent the publication of fake news and other disinformation on its social networking website. A malicious entity can generate transition data in the form of news articles that are not blatantly false or entirely truthful. As an example, the malicious entity could take news articles from legitimate sources and falsify names and dates or make other minor edits. Since the article is truthful for the most part, the machine learning model may classify it as real news and use it as training data, causing a minor shift in the news classifier. Over time, the malicious entity can increase the level of news falsification. Eventually, the news classifier will have shifted to the point that the news classifier can no longer distinguish between real news and fake news, at which point the malicious entity is free to publish disinformation on the social networking website without consequence.

This vulnerability and its exploitation can have serious consequences. Malicious entities that can successfully induce model shift can subvert machine learning models used to identify fake news, detect credit card fraud, and prevent network intrusion, allowing the malicious entity to freely distribute disinformation, commit fraud, and illegally access secure networks.

Embodiments of the invention provide for an advantage over conventional machine learning systems because embodiments allow for the detection and prevention of model shift. By comparing classification data produced by a current machine learning model and classification data produced by a plurality of previously generated machine learning models, a computer can determine whether model shift has occurred. Further, the computer can determine whether the received input data is associated with a malicious entity. Once the computer has identified the malicious entity, the computer can block input data associated with the malicious entity, preventing the malicious entity from inducing further model shift. Additionally, the computer can retrain the current machine learning model in order to correct for any induced model shift. As a result, embodiments of the invention are more resistant to outside interference than conventional machine learning systems, and are consequently more secure than conventional machine learning systems.

The concept of model shift may be better understood with reference to FIG. 1, which shows a state transition diagram corresponding to model shift in an exemplary support vector machine. A support vector machine is a machine learning model that can classify input data into two different categories, such as real news and fake news. In a support vector machine, the "feature space" is divided by a hyperplane. Input data is classified based on the position of a corresponding feature vector in the feature space, relative to the dividing hyperplane, i.e., the input data is classified with a first classification if the feature vector is located on one side of the hyperplane and the input data is classified with a second classification if the feature vector is located on the other side of the hyperplane. As a simplified example, the feature space for a news classifier may have two dimensions: word count and number of spelling errors, although typically in real world applications, the feature space will have more than two dimensions. For a given news article (input data), the feature vector (i.e., the word count and number of spelling errors) can be determined. Generally, the features of the feature vector can be interpreted as coordinates in the feature space divided by the hyperplane.

In general terms, training a support vector machine involves determining the characteristics of the dividing hyperplane using labeled training data. The labeled training data can consist of feature vector classification pairs. For example, a word count and a number of spelling errors and a corresponding classification (e.g., fake news). These classifications can be determined, for example, by a subject matter expert. Training a support vector machine involves determining the equation of a hyperplane that separates the training data based on its classification, and further maximizes the distance between the labelled training data and the hyperplane.

A self-learning support vector machine can use its own classifications of training data in order to train itself. For example, a self-learning support vector machine can be trained off a set of labeled training data. After an initial training, the support vector machine can classify input data. The support vector machine can label the input data using its classification, then retrain itself using the set of labelled training data and the newly classified input data. This retraining can occur at any appropriate rate or frequency, e.g., after a certain amount of input data is received, hourly, daily, etc.

In FIG. 1, state diagrams 102, 104, and 106 show the state of a support vector machine at different points in time, with state diagram 102 corresponding to an initial state (e.g., after the support vector machine has been trained with an initial set of training data), state diagram 104 corresponding to an intermediate state (e.g., after the support vector machine has been retrained with newly classified input data), and state diagram 106 corresponding to a final state (e.g., after the support vector machine has been retrained for a second time using newly classified input data). The state diagrams are a two-dimensional representation of the feature space of the support vector machine. In each state diagram 102, 104, and 106, a hyperplane (102A, 104A, and 106A) divides the feature space into two sides. Feature vectors corresponding to training data are represented by shapes (i.e., circles, triangles and pentagons) are grouped into data clusters 102C, 102D, 104C, 104D, 106C, and 106D. The circles represent feature vectors corresponding to input data of a first classification (e.g., real news), and the triangles corresponding to input data of a second classification (e.g., fake news). The pentagons represent feature vectors correspond to transition data. Transition data is generated by a malicious entity to appear to belong to one classification (e.g., real news) but possess qualities corresponding to the other classification, in order to induce model shift. In FIG. 1, the exemplary transition data appears to belong to the first classification, and as such is included in clusters 104C and 106C.

As a malicious attacker introduces transition data to the support vector machine (e.g., transition data 104F and transition data 106F), the classified transition data is included in the training data and the model is retrained. Model shift occurs as data clusters and the hyperplane move as a result of the introduced transition data. As an example, data cluster 104C has grown and shifted to the right of data cluster 102C.

State diagram 102 shows the initial state of the support vector machine. In state diagram 102, a hyperplane 102A separates feature vectors corresponding to two classifications (e.g., feature vectors 102B and 102E), which are clustered in clusters 102C and 102E. These feature vectors may have been part of a labeled, initial training data set provided to the support vector machine.

State diagram 104 shows the state of the support vector machine after transition data (e.g., feature vector 104F) has been introduced to the training data set. This transition data can be generated by a malicious entity in order to induce model shift. In some cases, transition data may generally resemble data belonging to one class (e.g., feature vector 104B), but may exhibit some characteristics corresponding to data of the second class (e.g., feature vector 104E). Transition data may comprise real news articles that a malicious entity has doctored to exhibit some characteristics of fake news articles (e.g., 104E). As the transition data are on the left side of hyperplane 104A, the support vector machine may classify the transition data as belonging to the first class (e.g., real news). However, as the transition data are closer to hyperplane 104A than other first class data points (e.g., circle 104B), the hyperplane shifts from its original position (102A) to a new position in order to increase the distance between the transition data and the hyperplane 104A. This new position is closer to the data points corresponding to the second class (e.g., triangle 104E) and the volume or size of the feature space corresponding to the first classification increases. As a result, the proportion of input data classified as the first classification increases.

State diagram 106 shows the state of the support vector machine after additional transition data has been provided to the support vector machine. This new transition data (e.g., feature vector 106F) is even closer to feature vectors of the second classification, such as feature vector 106E. As a result, the clusters corresponding to the first class and the second class overlap, and the hyperplane 106A can only maintain a small distance between the two classes. Further, the side of the feature space corresponding to real news is significantly larger than in either state diagram 102 or 104. As a result, data that belongs to the second class (e.g., fake news) may incorrectly be classified as belonging to the first class (e.g., real news).

Figure 2:
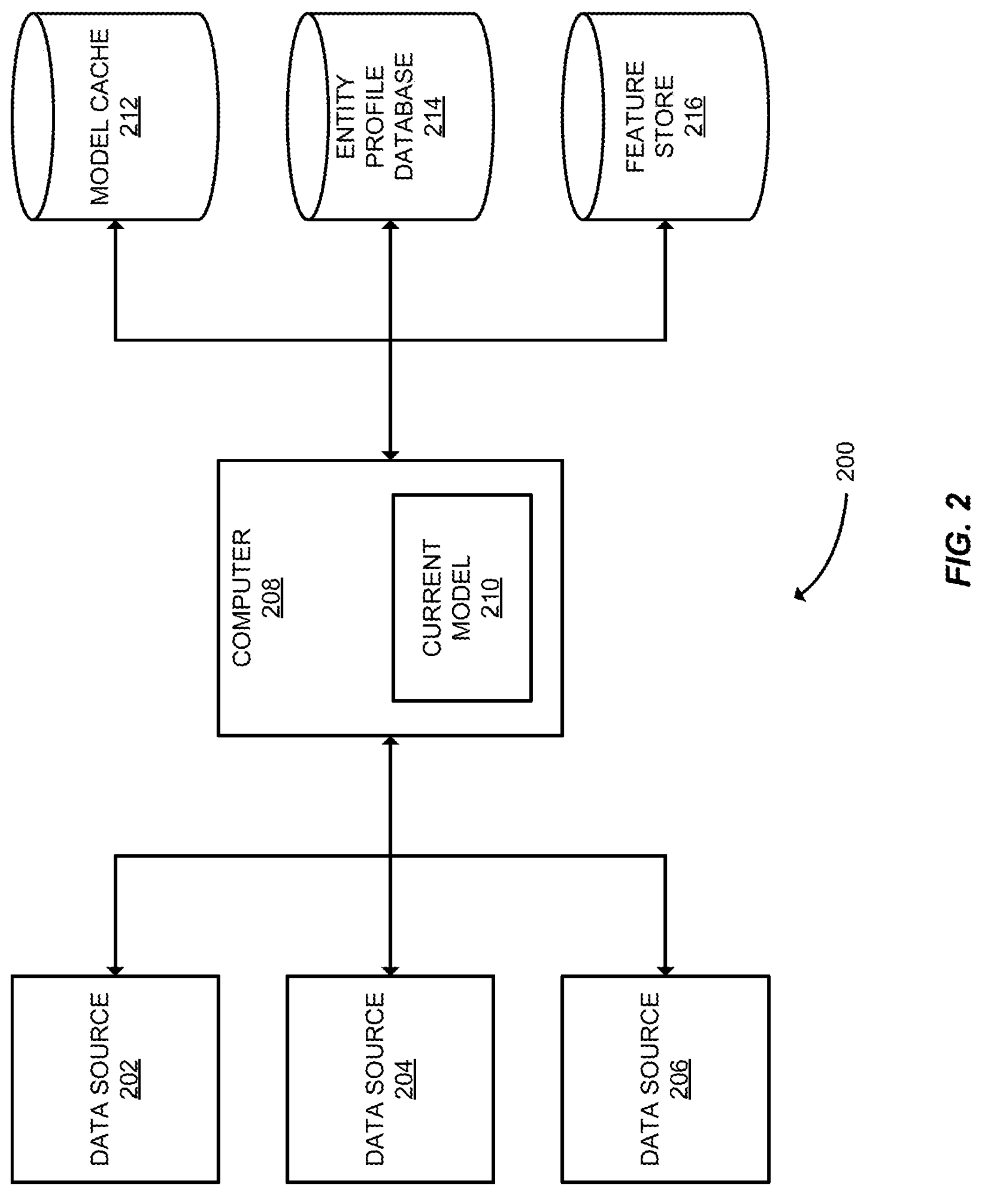
FIG. 2 shows a system block diagram of a data processing system according to some embodiments of the invention.

FIG. 2 shows a machine learning data processing system 200, comprising data sources 202, 204, and 206, a computer 208 using a current machine learning model 210, a model cache 212, an entity profile database 214, and a feature store 216. Although three data sources 202, 204, and 206 are shown, methods according to embodiments of the invention can be practiced with any number of data sources. FIG. 2 is intended to illustrate an exemplary arrangement of databases, computers, and data sources according to some embodiments of the invention, and is not intended to be limiting.

The databases, computer, and data sources can communicate with one another via any appropriate means, including a communications network. Messages and other communications between the databases, computer, and data sources may be in encrypted or unencrypted form. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the devices and computers may be transmitted using a secure communications protocol such as, but not limited to, File Transfer Protocol (FTP); Hypertext transfer Protocol (HTTP); Secure Hypertext Transfer Protocol (HTTPS), Secure Socket Layer (SSL) and/or the like.

In general terms, the computer 208 uses a current machine learning model 210 to evaluate input data produced by data sources 202, 204, and 206 for some purpose. As an example, computer 208 may be associated with a social network, and may be used to evaluate news articles in order to identify fake news articles before they can be posted to the social network. Data sources 202, 204, and 206 may be news websites that generate input data in the form of news articles that are received by the computer 208. The computer 208 uses a current machine learning model 210 in order to produce classification data corresponding to the input data received from data sources 202, 204, and 206. As examples, the classification data could correspond to a classification such as "fake news" or "real news."

The computer 208 can additionally retrain the current machine learning model 210 using the input data and the classification data, effectively allowing the current machine learning model 210 to learn from its own classifications. Further, the computer 208 can retrieve data from databases such as a model cache 212, entity profile database 214, and feature store 216.

Additionally, the computer 208 can evaluate the current machine learning model 210 and the input data in order to determine if model shift has occurred, and additionally determine whether one or more of the data sources 202, 204, and 206 are malicious entities that are intentionally introducing model shift in the current model 210 for some purpose (e.g., in order to evade a news classifier and publish fake news on a social media website). The computer 208 may evaluate the current machine learning model 210 and the input data using a metadata test and/or a previously generated machine learning model test. These tests are described in greater detail below with reference to FIGS. 5A and 5B.

Model cache 212 can include any appropriate data structure for storing machine learning models, and may be implemented on a standalone computer or server computer, or implemented on one or more computer systems that also implement computer 208. The machine learning models stored in model cache 212 may evaluate input data or feature vectors derived from input data and output corresponding classification data.

In some embodiments, each machine learning model may correspond to a data source, such that input data produced by each data source is modeled by a dedicated machine learning model. Additionally, model cache 212 may store multiple machine learning models corresponding to each data source, such as a current machine learning model and a number of previously generated machine learning models. For example, each month the computer 208 may train a new machine learning model corresponding to a data source. The newly generated machine learning model may be stored in model cache 212 along with previously generated machine learning models corresponding to that data source.

Models in model cache 212 may be stored in any appropriate form, such as a collection of parameters and/or weights (e.g., weights corresponding to a neural network machine learning model). Models in model cache 212 may be indexed by a corresponding entity identifier, a model identifier, or the "type" or machine learning model (e.g., recurrent neural network, isolation forest, support vector machine, etc.). Models stored in model cache 212 may be retrieved, trained, and/or used to evaluate input data by computer 208. The models may be trained on labeled feature vectors stored in feature store 216. Further, the computer 208 may retrieve a plurality of previously generated machine learning models stored in model cache 212 for the purpose of evaluating the performance of the current machine learning model 210.

The entity profile database 214 may contain records of entity profiles corresponding to each data source 202, 204, 206. These records may contain information about the data source, such as its type (e.g., webserver, human user, client computer, etc.) its affiliation (e.g., news organization, business, government), entity credentials associated with the entities, etc. In some embodiments, the computer 208 may query the entity profile database 214 in order to identify data sources 202, 204, and 206. In some embodiments, there may be a current machine learning model 210 corresponding to each data source in order to improve the accuracy of evaluations performed by computer 208. Entity profiles in entity profile database 214 corresponding to data sources 202, 204, and 206 may reference the current machine learning model corresponding to that data source. The computer 208 may query the entity profile database 214 in order to determine the correct machine learning model to use as the current machine learning model 210, then extract the corresponding machine learning model from model cache 212.

Feature store 216 may be any appropriate data structure for storing labeled or unlabeled feature vectors. Feature store 216 may be implemented on a standalone computer or server computer, or implemented on one or more computer systems that implement computer 208. The feature vectors in feature store 216 may comprise feature vectors corresponding to input data paired with classification data, e.g., a feature vector corresponding to a news article paired with a classification such as "real news." Feature vectors stored in feature store 216 may additionally have corresponding labels, such as normal or anomalous, i.e., whether the feature vector corresponds to common, normal, or expected input data or whether the feature vector corresponds to unusual or anomalous input data. In some cases feature vectors stored in feature store 216 may be labeled with an anomaly score, such as 99/100. A high anomaly score may indicate that the labeled feature vector corresponds to an anomalous input data (such as a fake news article). The feature vectors in feature store 212 may be used by the computer 208 to train the current machine learning model 210, as well as other machine learning models stored in model cache 212. Additionally, computer 208 may write received input data, along with corresponding classification data as labelled feature vectors to feature store 216. The labelled feature vectors may be used to train or validate the current machine learning model 210 at a later time.

Figure 3:
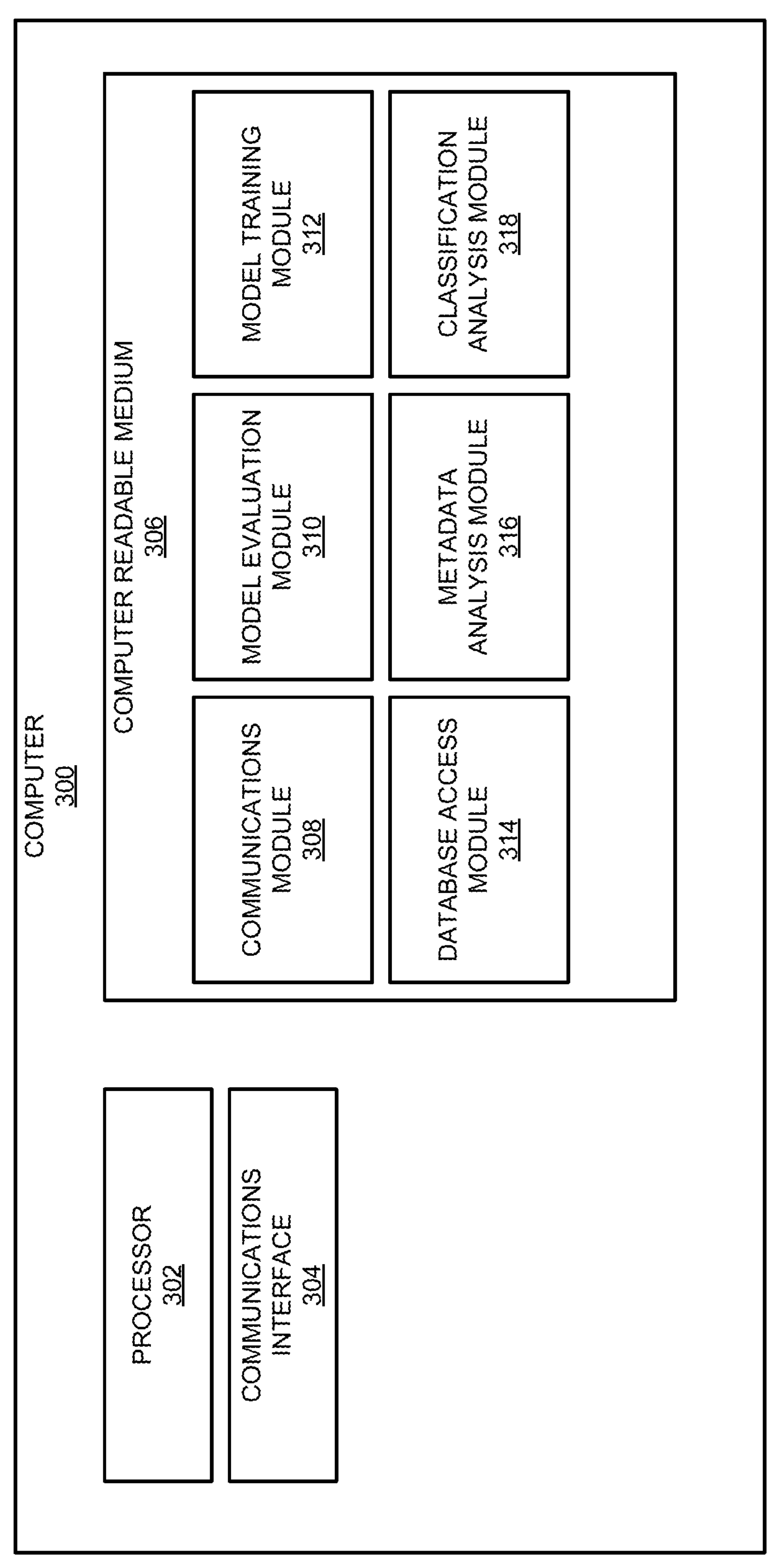
FIG. 3 shows a block diagram of a computer according to some embodiments of the invention.

FIG. 3 shows an exemplary computer according to some embodiments of the invention. Computer 300 may comprise a processor 302, a communications interface 304, and a computer readable medium 306. The computer readable medium 306 may comprise a number of software modules, including a communications module 308, a model evaluation module 310, a model training module 312, a database access module 314, a metadata analysis module 316, and a classification analysis module 318.

Processor 302 may be any suitable processing apparatus or device as described in the terms section above. The communications interface 304 may comprise a network interface that enables the computer 300 to communicate with other computers or systems over a network such as the Internet.

Communications module 308 may comprise code or software, executable by the processor 302 for enabling communications between the computer 300 and other entities, including data sources. The computer 300 may use the communications module 308 to receive sets of input data from data sources. Further, the communications module 308 may comprise code or other features used to disable, prevent, or block communications from external entities to computer 300. For example, the communications module 308 may include a whitelist file, containing a list of approved entities and their corresponding electronic addresses (e.g., IP addresses) that are allowed to communicate with the computer 300. Alternatively or additionally, the communications module 308 may include a blacklist file, containing a list of entities that are not permitted to communicate with computer 300.

Model evaluation module 310 may comprise code or software, executable by the processor 302 for evaluating input data using machine learning models, including a current machine learning model and a plurality of previously generated machine learning models. Further, model evaluation module 310 may be used by the processor 302 to generate a first set of classification data by applying a set of input data to the current machine learning model, and generate a plurality of sets of classification data by applying the input data to a plurality of previously generated machine learning models.

Model training module 312 may comprise code or software, executable by the processor 302 for training and retraining machine learning models using input data, classification data, and any other training data, such as training data retrieved from a database such as feature store 216 from FIG. 2. The model training module 312 may comprise code enabling the computer 300 to train the current machine learning model using a set of input data and a corresponding first set of classification data, allowing self-learning by the current machine learning model. Further, if model shift has been detected, the model training module 312 may be used to retrain the current machine learning in order to correct the model shift.

Database access module 314 may comprise code or software, executable by the processor for accessing databases, such as a model cache, entity profile database, or feature store, as depicted in FIG. 2. The computer 300 may use the database access module 314 in order to retrieve a plurality of previously generated machine learning models from a model cache to evaluate the performance of a current machine learning model. Additionally, the database access module 314 may be used by computer 300 in order to modify or delete records in a database. For example, if the computer detects that input data is associated with a malicious entity, the computer 300 may use the database access module to modify an entity profile in an entity profile database and flag the profile as corresponding to an untrustworthy entity. The database access module 314 may additionally be used by computer 300 to retrieve training data or other feature vectors from a feature store.

The metadata analysis module 316 may comprise code or software, executable by the processor for performing metadata analysis of the current machine learning model in order to determined if model shift has occurred. Generally, the metadata analysis involves comparing some characteristic of the current machine learning model before and after the current machine learning model is trained using input data received from a data source. For example, the distance between clusters of training data before and after the input data is included in the training data set, or the standard deviation of a feature of the training data set before and after the inclusion of the input data. Changes in the metadata may reflect model shift. The computer 300 may use the metadata analysis module 316 to determine first metadata corresponding to the current machine learning model before training, determine second metadata corresponding to the current machine learning model after training, analyze the first metadata and second metadata to determine a deviation metric, compare the deviation metric to a deviation threshold, and verify whether the deviation metric is greater than the deviation threshold. Metadata analysis is discussed in greater detail below with reference to FIGS. 5A and 6.

Classification analysis module 318 may comprise code or software, executable by the processor for performing a previously generated machine learning model comparison in order to identify model shift in the current machine learning model. Generally, the previously generated machine learning model comparison involves comparing a set of classification data produced by the current machine learning model with sets of classification data produced by previously generated machine learning models. If the current machine learning model produces classification data that is different than the classification data produced by the previously generated machine learning models, model shift may have occurred. The classification analysis module 318 may enable the computer 300 to combine the plurality of sets of classification data produced by the previously generated machine learning models to produce a comparison set of classification data, analyze the comparison set of classification data and first set of classification data to determine an error metric, and compare the error metric to an error threshold. Further, the classification analysis module may be used by computer 300 to determine if the set of input data is associated with a malicious entity, e.g., the computer 300 may determine that the set of input data is associated with a malicious entity if the error metric exceeds the error threshold.

Figure 4:
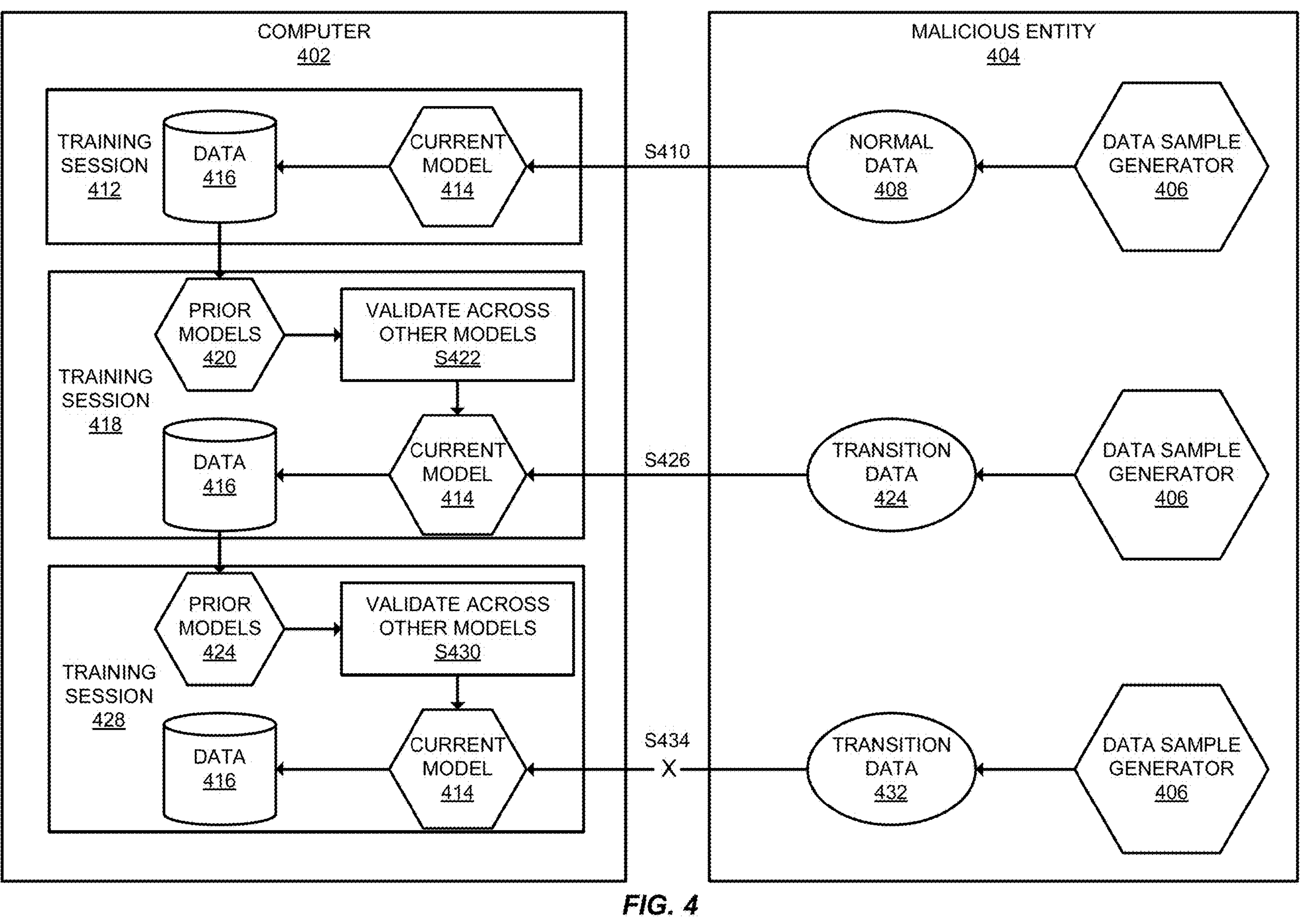
FIG. 4 shows a hybrid block diagram of an interaction between a computer and a malicious entity according to some embodiments of the invention.

FIG. 4 shows a diagram of an interaction between a computer 402 and a malicious entity 404, which may be useful in understanding embodiments of the invention. The computer 402 is substantially the same computer described above, and can train, evaluate, retrain, and apply input data to a current machine learning model to produce classification data. The malicious entity 404 is capable of generating input data using a data sample generator 406. This can include both normal data 408 and transition data 424 and 432. It is assumed that the computer 402 is not initially aware that the malicious entity 404 is malicious, and instead views it as any other data source.

Initially, the malicious entity 404 may send generate and send normal data 408 to the computer 402 at step S410. The malicious entity 404 may send this normal data in order to determine how the current machine learning model 414 classifies normal input data. The malicious entity 404 may evaluate the resulting classification data in order to learn enough information about the current model 414 in order to generate transition data 418 and 432 that can be used to induce model shift in the current model 414.

The computer can classify normal data 408 using the current model 414. Afterwards, during a first training session 412, the normal data 408 and the classifications can be stored in database 416, which may be a database such as feature store 216 from FIG. 2.

During a second training session 418, the computer 402 can retrieve a plurality of previously generated machine learning models (prior models 420) from a model cache. Additionally, the computer can extract the normal data 408 and corresponding classification data from database 416.

At step S422, the computer can evaluate the current model 414 using the prior machine learning models 420. For example, the computer can generate a first set of classification data using current model 414 and a plurality of sets of classification data using prior models 420. The first set of classification data can be compared to the plurality of sets of classification data in order to determine if model shift has occurred. More details on methods of classification data comparison are described below with reference to FIGS. 5A, 5B, and 7.

The malicious entity 404 may generate transition data 424 using data sample generator 406. The malicious entity 404 may have learned about the characteristics of the current model 414 using the normal data 408, e.g., the separations between clusters of different training data points, an estimate of the equation of a hyperplane for a support vector machine, etc. As such, the malicious entity 404 may have determined the characteristics of transition data that will successfully induce model shift in the current model 414. These characteristics may include, for example, statistical qualities, such as the difference between the transition data 424 and an average data point corresponding to the training data set. The malicious entity 404 may transmit the transition data 424 to the computer 402 at step S426. Using the current model 414, the computer 402 may classify the transition data 424 and produce a set of classification data, then use the transition data 424 and the classification data to retrain the current model 414, inadvertently inducing model shift in the process. The transition data 424 and corresponding classification data can be stored in database 416 in order to be validated at a third training session 428.

During a third training session 428, the computer 402 may retrieve a plurality of previously generated machine learning models from a model cache or other suitable database (prior machine learning models 420). The computer 402 may retrieve the transition data 424 and corresponding classifications from database 416, and may apply the transition data 424 as an input to the prior machine learning models 420 to produce a plurality of sets of classification data.

At step S430, the computer 402 may validate the transition data 424 and current machine learning model 414 using the plurality of sets of classification data produced by the prior machine learning models 420. The computer 402 may compare the plurality of sets of classification data produced by prior models 420 to the classification data produced by the current model 414. If the plurality of sets of classification data are different from the classification data produced by the current model 414, the computer 402 may determine that model shift has occurred. As an example, if the computer 402 is a news classifier, the current model 414 may produce a classification of the transition data 424 or other data stored in database 416 as "real news" while the prior machine learning models 420 classify the transition data 424 as "fake news." As model shift may have occurred, the computer 402 can retrain the current model 414 using the plurality of sets of classification data produced by prior machine learning models 420. In this way, the current machine learning model 414 may shift back toward the prior models 420, counteracting the shift caused by the transition data 424. Further, based on the validation step S430, the computer 402 may determine that the transition data 424 is associated with a malicious entity, and may determine that the malicious entity 404 is malicious.

The malicious entity 404 may generate additional transition data 432 using data sample generator 406. This transition data is intended to cause further model shift in current machine learning model 414. At step S434 the malicious entity 404 may attempt to transmit the transition data 432 to the computer 402. However, as the computer 402 has identified that the malicious entity 404 is malicious, it may block or otherwise ignore transition data 432, preventing further model shift.

Figure 5A:
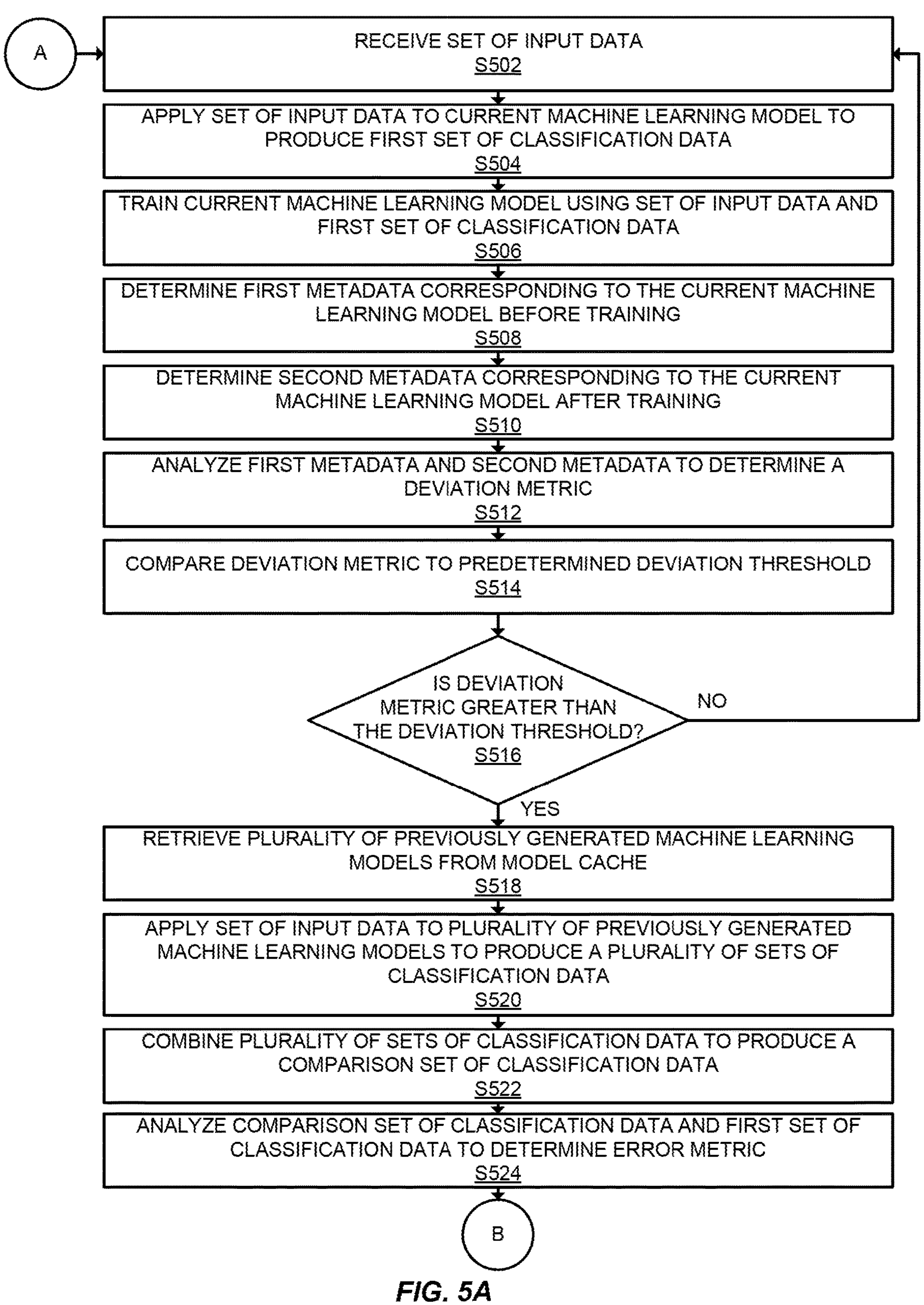
FIG. 5A shows a first part of a method of detecting and correcting model shift according to some embodiments of the invention.
Figure 5B:
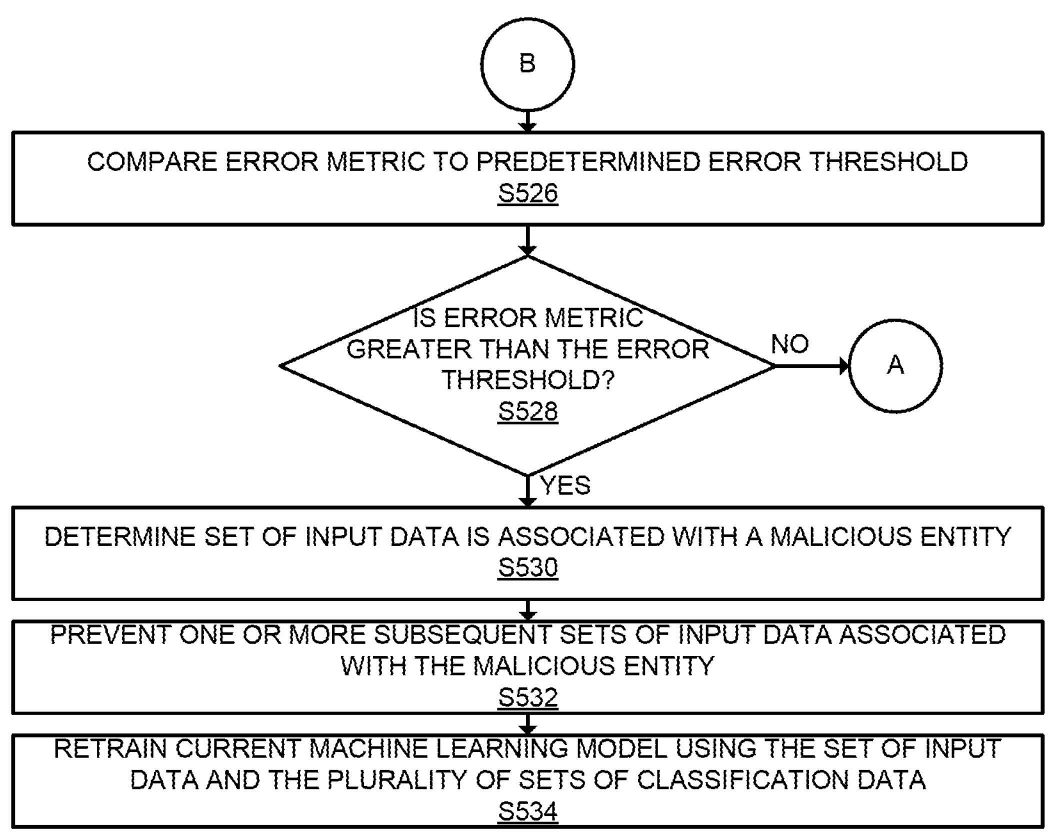
FIG. 5B shows a second part of a method of detecting and correcting model shift according to some embodiments of the invention.

FIGS. 5A-5B show a method performed by a computer according to some embodiments of the invention. The method involves receiving input data from a data source, classifying the input data, then using the classified input data to train a current machine learning model. The computer can evaluate the current machine learning model to determine if model shift has occurred. If model shift has occurred, the computer can retrain the current machine learning model and determine that the input data corresponds to a malicious entity.

At step S502, a computer (e.g., computer 208 from FIG. 2) receives a set of input data from a data source (e.g., data source 202 from FIG. 2). The data source may be a malicious entity, and may also be computer that interfaces or communicates with the computer, either directly or via a network such as the Internet. The data source may communicate with the computer via an API. Additionally, the data source may possess a credential that allows it to communicate with the computer, such as an API key, password, PIN, etc. The credential may be verified by the computer prior to further communications between the computer and the data source. The input data may be received in any appropriate form, e.g., encrypted, unencrypted, compressed, etc.

As an example, the data source may be a client computer and the computer may be associated with a social networking webserver. The user operating the client computer may attempt to post a web address to a page on the social networking site. The user operating the client computer inputs a username and password (credential). The computer receives the web address (or the website corresponding to the web address) as the set of input data.

At step S504, the computer applies the set of input data to a current machine learning model to produce a first set of classification data. The set of input data may be received from one or more data sources and may be in any appropriate form. In some embodiments, the computer may normalize, clean, or otherwise process the set of input data before applying the set of input data to the current machine learning model. For example, the computer may process the input data in order to generate a feature vector that is applied to the current machine learning model. As another example, the input data may be a URL, such as the address of a website. The computer may follow the URL, extract the contents of the website, generate a feature vector based on the contents of the website, and apply the feature vector as an input to the current machine learning model.

The current machine learning model may be any appropriate machine learning model, such as a support vector machine, isolation forest, etc. Additionally, the current machine learning model may be an ensemble model comprising a number of different machine learning models, e.g., an ensemble comprising an isolation forest and a support vector machine. The current machine learning model may be stored in a model cache and may be retrieved by the data process prior to applying the set of input data to the current machine learning model. The current machine learning model may be stored in the model cache as a collection of parameters or weights that characterize the machine learning model, or may be stored in any other suitable form. In some embodiments, the current machine learning model may be a best performing model from a collection of models. For example, the computer may test a plurality of machine learning models using a validation data set. The machine learning model that performs best on the validation data set (e.g., has the lowest error score or deviation from expected output) may be used by the computer as the current machine learning model. The current machine learning model may be retrained regularly, e.g., each hour, each night, after a certain amount of input data has been received (e.g., 200 MB), etc.

The current machine learning model can produce a first set of classification data using the input data or feature vectors derived from the input data. The classification data may comprise a binary classification, such as "fake news" or "real news." Alternatively, the classification data may comprise a classification that can take on more than two values, e.g., for an animal classifier, "cat," "dog," "rabbit," etc. As another alternative, the classification data can take on a continuous range of values, e.g., 0-100%. The classification data may correspond to the probability that the input data belongs to a given class. For example, classification data of "95%" for a news classifier may correspond to a 95% chance that the input data corresponds to a fake news article, and a 5% chance that the input data corresponds to a real news article. In a computer that uses the current machine learning model for anomaly detection, the classification data may be an anomaly score, and may relate to how anomalous or abnormal the input data is (e.g., whether the input data is an outlier of the data set comprising the training data and the input data).

At step 506, the computer trains the current machine learning model using the set of input data and first set of classification data. The computer may generate one or more labeled training data points from the set of input data (or feature vectors derived from the set of input data) and the first set of classification data. The computer may store the one or more labeled training data points in a feature store for later use in training and evaluating machine learning models. The training process may depend on the nature of the current machine learning model. For example, for an support vector machine, the training process may involve determining a hyperplane that separates feature vectors corresponding to one label (e.g., real news) from feature vectors corresponding to another label (e.g., fake news).

At step 508, the computer determines first metadata corresponding to the current machine learning model before training. The first metadata may correspond to some metric or characteristic of the current machine learning model before the current machine learning model has been retrained using the input data. As an example, this metric can be the distance between different clusters of data points in the training data set. Alternatively, for a machine learning model such as an artificial neural network, the first metadata could comprise a collection of weights corresponding to neurons in the network. As another alternative, for a machine learning model such as a decision tree, the first metadata could comprise the depth of the tree, a branching factor, etc.

At step 510, the computer determines second metadata corresponding to the current machine learning model after training. The second metadata may correspond to some metric or characteristic of the current machine learning model after the current machine learning model has been trained. For example, the distance between different clusters of data points in the training data set after the current machine learning model has been retrained using the input data.

At step 512, the computer analyzes the first metadata and second metadata to determine a deviation metric. As an example, the computer can compare the first and second metadata and may generate a deviation metric based on the comparison. For example, if the first metadata and second metadata correspond to the distance between two clusters of data points before and after training, the computer can generate a deviation metric that is the difference between the two distances. Alternatively, if the first metadata and second metadata can be represented as vectors, the computer can determine a deviation metric that is proportional to the similarity between the first metadata and the second metadata, e.g., a dot product of the first metadata and second metadata.

Figure 6:
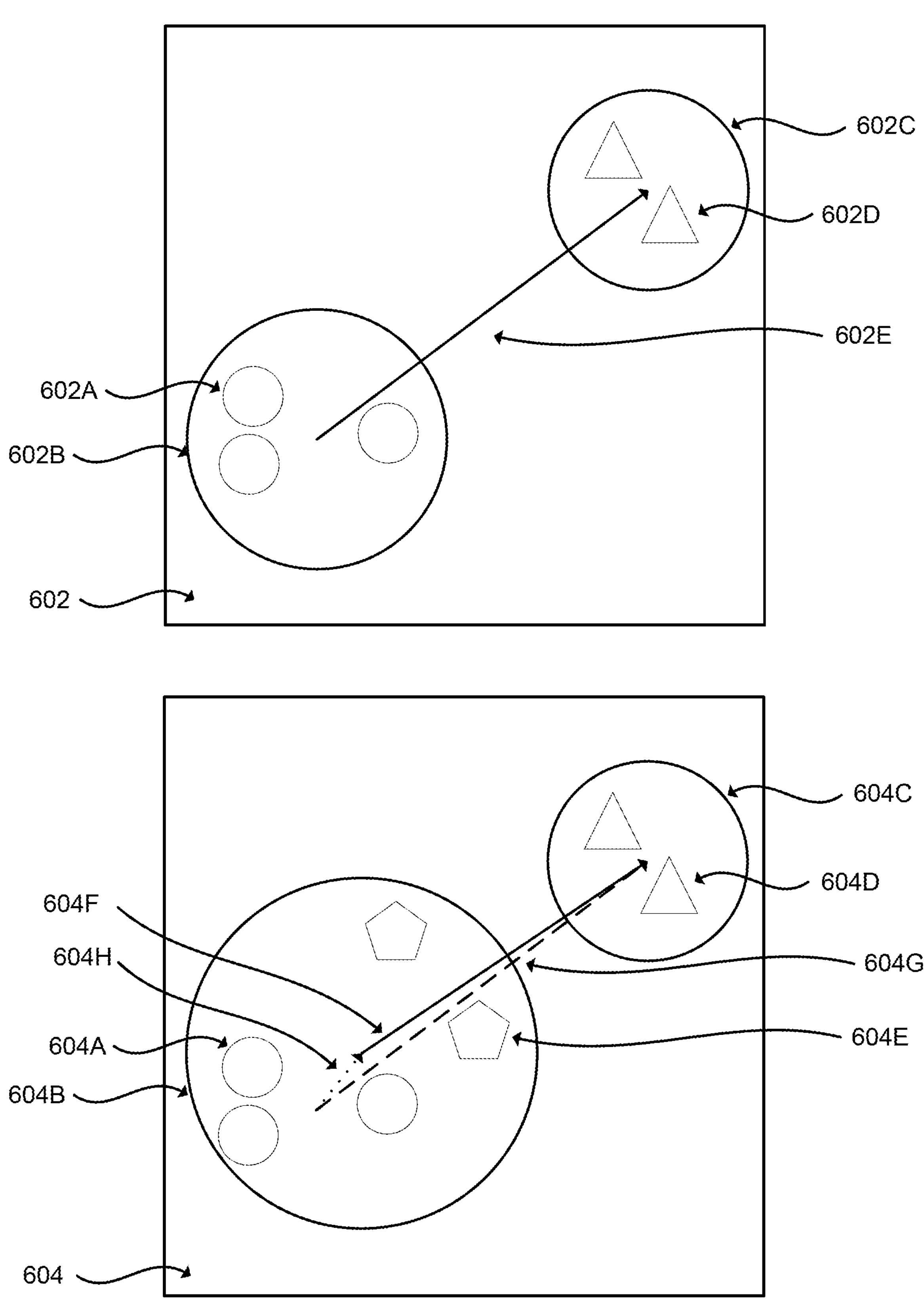
FIG. 6 shows a diagram of an exemplary metadata evaluation according to some embodiments of the invention.

Steps S506-S512 may be better understood with reference to FIG. 6, which shows an exemplary metadata comparison technique according to some embodiments of the invention. FIG. 6 shows two state diagrams 602 and 604. Data points or feature vectors are represented by circles (e.g., 602A and 604A), triangles (e.g., 602D and 604D), and pentagons (e.g., 604E), with circles corresponding to a first classification (e.g., real news), triangles corresponding to a second classification (e.g., fake news), and pentagons corresponding to transition data.

State diagram 602 corresponds to a machine learning model before it has been retrained with transition data. Data points corresponding to the first classification are located inside a cluster 602B, while data point corresponding to the second classification are located in a cluster 602C. The first metadata referenced in step S508 of FIG. 5A, may comprise vector 602E. Vector 602E points from the center of cluster 602B to the center of cluster 602C, and its magnitude is equal to the distance between the centers of the two clusters.

State diagram 604 corresponds to a machine learning model after it has been trained with transition data, such as data point 604E. As a result of the transition data, the data cluster corresponding to the first classification 604B has expanded toward the data cluster corresponding to the second classification 604C. The dashed vector 604G is the same vector as vector 602E from FIG. 1. The second metadata of step S510 of FIG. 5A may comprise vector 604F, which points from the center of cluster 604B to the center of cluster 604C. The dotted vector 604H comprises the difference between vectors 604F and 604G, i.e., the difference between the first metadata and the second metadata. Vector 604H is indicative of the direction and intensity of model shift that occurred as a result of including transition data in the training data set. Vector 604H may be used by the computer as a deviation metric.

Returning to FIG. 5A, at step 514, the computer can compare the deviation metric to a deviation threshold. The deviation threshold may be determined using any appropriate means. For example, the deviation threshold may be based off historical deviation or model shift in the current machine learning model. The current machine learning model may experience natural model shift with known direction average, direction standard deviation, magnitude average, and magnitude standard deviation. The deviation threshold may correspond to deviations that are statistically unlikely given the known averages and standard deviations, for example, a deviation threshold of "3" may correspond to model shift that is three standard deviations above or below average natural model shift. The deviation threshold may be static and may be predetermined, however, the computer can also adapt the deviation threshold periodically and determine the value of the deviation threshold using machine learning techniques, for example, by generating a decision tree that is used to dynamically set the deviation threshold depending on conditions such as the rate of received input data.

At step 516, the computer can determine whether the deviation metric is greater than the deviation threshold. If the deviation metric is greater than the deviation threshold, the computer proceeds to step 518. If the deviation metric is less than the deviation threshold, model shift is either not occurring, or occurring no more than would be expected based on historical trends. As such, the computer can return to step S502 and continue to receive input data from data sources.

At step 518, the computer can retrieve a plurality of previously generated machine learning models from a model cache. These plurality of previously generated machine learning models may be stored in the model cache in any appropriate form, e.g., as a collection of parameters or weights that describe the model. In some embodiments, each of the plurality of previously generated machine learning models may have an associated timestamp. The associated timestamp may indicate the date and time when the previously generated machine learning model was generated, when it was last used, or when it was used as a current machine learning model. In some embodiments, the set of previously generated machine learning models may be similar to the current machine learning model, for example, a previously generated machine learning model may correspond to the current machine learning model one week ago (before being retrained with a week's worth of new input data) and another previously generated machine learning model may correspond to the current machine learning model one month ago. In other embodiments, the set of previously generated machine learning models may have previously been the current machine learning model, but aren't necessarily "similar" to the current machine learning model. As an example, the current machine learning model may be a support vector machine, while one of the previously generated machine learning models is an isolation forest that was the "current" machine learning model two months ago. The previously generated machine learning models may be machine learning models created periodically over any appropriate length of time (e.g., a period of one month or more).

The computer may retrieve the plurality of previously generated machine learning models from the model cache using any appropriate querying or sampling procedure. In some embodiments, the plurality of previously generated machine learning models may be randomly sampled from the model cache. For example, the model cache may contain 100 machine learning models generated over the course of a year, and the plurality of previously generated machine learning models may be 10 machine learning models randomly selected from the 100 machine learning models. Alternatively, the computer may randomly select a previously generated machine learning model from each month, for a total of 12 machine learning models in the plurality of previously generated machine learning models.

At step 520, the computer can apply the set of input data to the plurality of previously generated machine learning models to produce a plurality of sets of classification data. This may be accomplished in substantially the same way as the input data was applied to the current machine learning model in step S504, and may involve the computer cleaning, normalizing, or otherwise processing the data so that it may be used as an input to the plurality of previously generated machine learning models.

Figure 7:
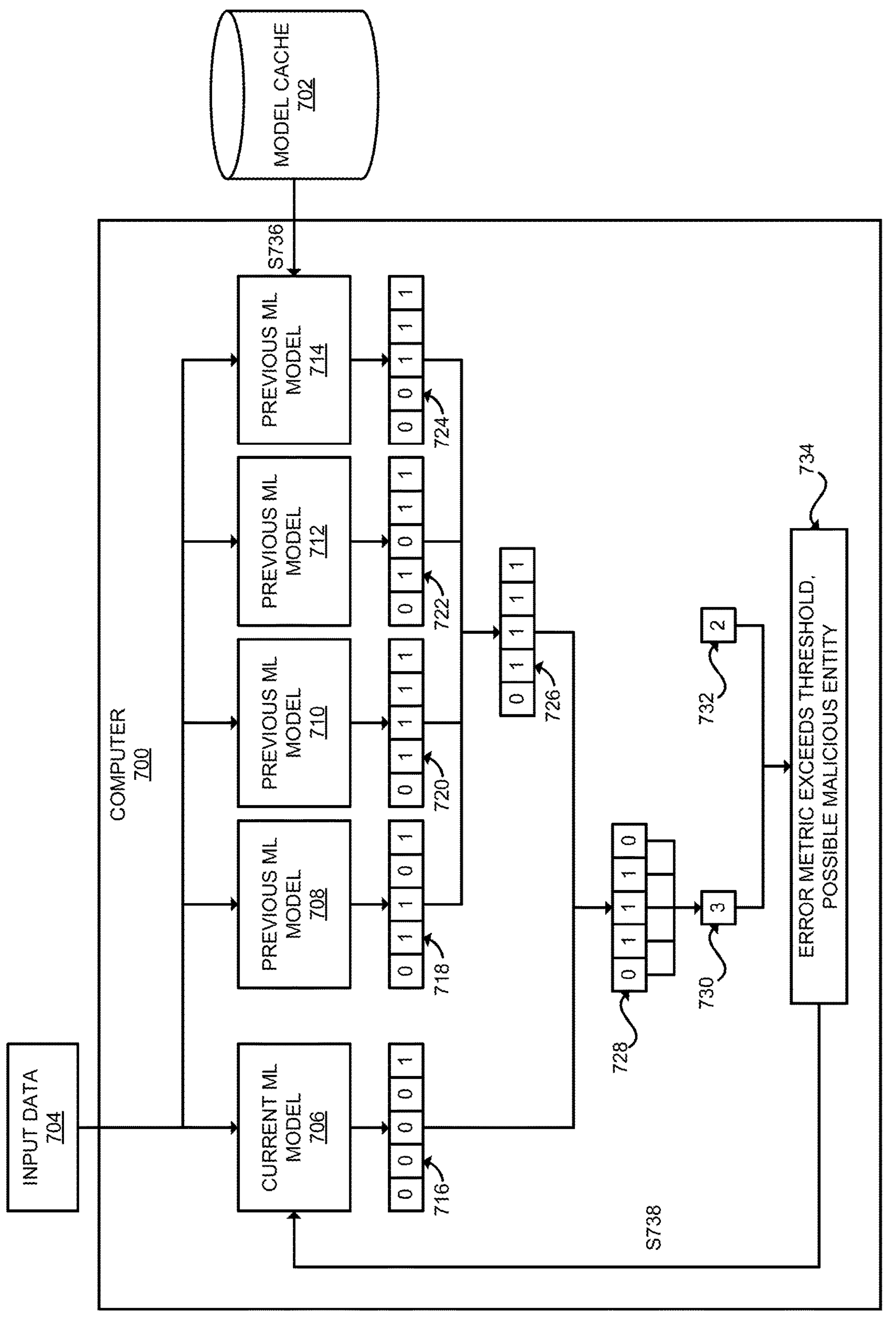
FIG. 7 shows a diagram of an exemplary classification data evaluation according to some embodiments of the invention.

At step 522, the computer combines the plurality of sets of classification data to produce a comparison set of classification data. As an example, the computer could combine the plurality of sets of classification data by averaging the plurality of sets of classification data. Alternatively, the comparison set of classification data could comprise a median or mode of the plurality of sets of classification data, or could be produced in any other appropriate way. FIG. 7, discussed below, shows an example of a comparison set of classification data calculated from a plurality of sets of classification data.

At step 524, the computer can analyze the comparison set of classification data and the first set of classification data to determine an error metric. This error metric may be proportional to the difference between the comparison set of classification data and the first set of classification data. Thus the error metric may indicate the difference in the current machine learning model's classification and the classifications produced by the plurality of previously generated machine learning models. This difference may be proportional to the model shift. In some cases, the comparison set of classification data and the first set of classification data may be represented as vectors. The error metric may be a vector difference between these two vectors. Alternatively, the error metric may be another calculation based on the two vectors, such as a scalar product. In some embodiments, the error metric may be a distance metric describing the distance or dissimilarity between the first set of classification data and the comparison set of classification data, such as Hamming distance or Jaro-Winkler distance. The method flow continues on FIG. 5B.

At step 526, the computer can compare the error metric to an error threshold. As an example, the computer may determine whether the error metric is greater than, less than, or equal to the error threshold. The error threshold may be based off some underlying statistical knowledge of the error metric. For example, the error metric may have a known distribution, mean, and standard deviation. The error threshold may be set such that the error metric only exceeds the error threshold when the error metric has an unusually high value (e.g., the error metric is in the $95^{th}$ percentile of error metrics). Like the deviation threshold described above, the error threshold may be static and may be predetermined, however, the computer can also adapt the error threshold periodically and determine the value of the error threshold using machine learning techniques, for example, generating a decision tree that is used to dynamically set the error threshold depending on conditions such as the rate of received input data.

At step 528, the computer can determine if the error metric is greater than the error threshold. If the error metric is greater than the error threshold, the computer proceeds to step 530. If the error metric is less than the error threshold, the first set of classification data is similar to the comparison set of classification data. This implies that the current machine learning model is not classifying data differently than the plurality of previously generated machine learning models, and consequently no model shift, or very little model shift is taking place. In this case, the computer returns to step 502 on FIG. 5A and continues to collect input data from the data sources.

At step 530, the computer can determine that the set of input data is associated with a malicious entity. In previous steps, the computer determined that model shift was occurring, either based on a metadata test (as described in FIGS. 5A and 6) or by comparing classification data with a plurality of previously generated machine learning models, or a combination of the two. In some embodiments, the computer determines that the set of input data is associated with a malicious entity if the computer determines that model shift has occurred. In others, the computer may perform one or more further determinations to determine if the set of input data is associated with a malicious entity. For example, the computer may evaluate previous input data received from a data source and determine if the previous input data also caused model shift. If the previous input data and the set of input data both caused model shift, the computer may determine that the set of input data is associated with a malicious entity.

At step 532, the computer can prevent one or more subsequent sets of input data associated with the malicious entity. As an example, the computer can revoke a credential used by the malicious entity to communicate with the computer, such as an API key. Without the credential, the malicious entity can no longer send input data to the computer, and as a result, any subsequent sets of input data are prevented. As an alternative, the computer can add the malicious entity or an address associated with the malicious entity (e.g., an IP address) to a blacklist of entities that the computer will not communicate with.

At step 534, the computer retrains the current machine learning model using the set of input data and the plurality of sets of classification data. For example, the computer can label input data from the set of input data using classification data from the plurality of sets of classification data, or alternatively label the input data using the comparison set of classification data generated at step S522. The computer can retrieve further labeled training data from a feature store and retrain the current machine learning model using the now labeled input data and the further labeled training data. By training the current machine learning model using the classifications produced by the plurality of previously generated machine learning models, the current machine learning model is shifted back towards the previously generated machine learning models, correcting the model shift induced by the malicious entity.

FIGS. 5A and 5B describe both a metadata test (S508-S516) and a previous machine learning model comparison test (S518-S528) used to determine if model shift has occurred and if the input data is associated with a malicious entity. However, it should be understood that these tests may be optional. For example, in some embodiments, only the metadata test may be used to determine whether model shift has occurred and steps S518-S528 are not performed. In other embodiments, only the previous machine learning model comparison test is used to determine whether model shift has occurred and steps S508-S516 are not performed.

FIG. 7 shows a diagram of a computer 700 performing a previous machine learning model comparison test using a plurality of previously generated machine learning models (708, 710, 712, 714) according to some embodiments of the invention. FIG. 7 may be useful in understanding steps S518-S534 in FIGS. 5A and 5B.

As described above, the model cache 702 can store both current and previous machine learning models. Current machine learning model 706 can be the machine learning model that is presently used by computer 700 to classify input data 704. Previous machine learning models 708, 710, 712, and 714 can include machine learning models that were created at some point in the past, e.g., more than a month ago. Each previous machine learning model may be associated with a timestamp or timestamp range corresponding to the period of time that the previous machine learning models 708, 710, 712, 714 were either generated, trained, or used by the computer.

At step S736, the computer 700 may retrieve previous machine learning models 708, 710, 712, 714 from model cache 702. Although four previous machine learning models are shown, in embodiments of the invention, computer 700 may retrieve any number of previous machine learning models. The previous machine learning models 708, 710, 712, 714 may be retrieved from the model cache 702 using any appropriate selection or sampling procedure. For example, computer 700 may select a plurality of previously generated machine learning models from model cache 702 using a randomized sampling procedure. Alternatively, computer 700 may use a pseudorandom or partially random selection procedure, such as randomly selecting previous machine learning models based on corresponding timestamps. For example, computer 700 can select a previous machine learning model corresponding to each month of the year, randomly selecting one machine learning model from each month.

The computer can use current machine learning model 706 and previous machine learning models 708, 710, 712, and 714 to produce sets of classification data, with classification data 716 corresponding to the current machine learning model 706 and classification data 718, 720, 722, and 724 corresponding to previous machine learning models. In FIG. 7, classification data 716-724 is presented as five binary classification values. For example, these five binary classification values could correspond to classifications of five different input data points, such as five news article, with a value of zero corresponding to a real news article and a value of one corresponding to a fake news article. Classification data 716, for example, could correspond to a sequence of four news articles classified as real news and a fifth news article classified as fake news.

The plurality of sets of classification data (718, 720, 722, and 724) corresponding to the previous machine learning models (708, 710, 712, and 714) can be combined by computer 700 to produce a comparison set of classification data 726. Comparison set of classification data 726 can be produced by computer 700 in a number of ways. FIG. 7 shows a majority vote, wherein the majority classification for each of the five binary classification values is selected for the comparison of classification data 726. Another example is an average or weighted average, where the resulting comparison set of classification data 726 is an average of sets of classification data 718, 720, 722, and 724.

The comparison set of classification data 726 can be compared by the computer 700 to the set of classification data 716 produced by current machine learning model 706. The computer 700 can perform this comparison in a number of ways. One example (shown in FIG. 7) is element-wise exclusive-OR, producing a vector 728 with elements equal to zero when the set of classification data 716 is equal to the comparison set of classification data 726, and equal to one when the two sets of classification data are unequal. The sum of vector 728 can be determined in order to produce an error metric 730.

It should be understood that the production of error metric 730 can be accomplished in a number of ways, and that the above description is intended only as a non-limiting example. As another example, the error metric 730 could be equal to the magnitude of vector 728. In some cases, vector 728 may not be used at all, and instead error metric 730 may be equal to the dot product of vectors 716 and 726, or be based on a distance metric (e.g., Jaro-Winkler distance).

The computer 700 can compare the error metric 730 to an error threshold 732 and produce a determination 734. Because the error metric exceeds the error threshold, determination 734 indicates that the classification produced by the current machine learning model 706 is different than the classifications produced by previous machine learning models 708, 710, 712, and 714. This may indicate that a model shift has occurred, and that the input data 704 may be associated with a malicious entity.

As a result of determination 734, at step S738, computer 700 may retrain the current machine learning model 706. Computer 700 may use the input data 704 and sets of classification data 718, 720, 722, and 724 as training data. This will cause the current machine learning model 706 to shift back toward the previous machine learning models, correcting any shift induced by the input data 704 or a malicious entity. Additionally, computer 700 may take additional steps to prevent further tampering by the malicious entity, such as blocking or ignoring further input data 704 from that malicious entity, or revoking an entity credential that enables the malicious entity to communicate with computer 700.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:

receiving, by a computer, a set of input data associated with an entity having a credential allowing the entity to communicate with the computer;

applying, by the computer as an input, the set of input data to a trained current machine learning model;

in response to the input of the set of input data, producing, by the trained current machine learning model, a first set of classification data;

updating, by the computer, the trained current machine learning model using the set of input data and the first set of classification data to generate an updated current machine learning model;

determining, by the computer, first metadata corresponding to the trained current machine learning model before the updating, the first metadata corresponding to a metric or a characteristic of the trained current machine learning model before the updating;

determining, by the computer, second metadata corresponding to the updated current machine learning model, the second metadata corresponding to a metric or a characteristic of the updated current machine learning model;

analyzing, by the computer, the first metadata and the second metadata to determine a deviation metric;

determining, by the computer, that the deviation metric is greater than a deviation threshold;

in response to the deviation metric being greater than the deviation threshold:

applying, by the computer, the set of input data to a plurality of previously generated machine learning models, respectively, wherein the plurality of previously generated machine learning models do not include the updated current machine learning model;

producing, by the plurality of previously generated machine learning models, a plurality of sets of classification data in response to respectively applying the set of input data to the plurality of previously generated machine learning models;

determining, by the computer, whether the entity associated with the set of input data is a malicious entity attempting to induce a malicious shift of the trained current machine learning model toward incorrect classifications, the determining comprising:

combining the plurality of sets of classification data to produce a combined set of classification data, wherein both the combined set of classification data and the first classification set of data are produced for a same set of input data;

analyzing the combined set of classification data and the first set of classification data to determine an error metric, wherein the error metric indicates a difference in (1) one or more classifications included in the first set of classification data produced by the updated current machine learning model and (2) classifications included in the combined set of classification data from the plurality of previously generated machine learning models, wherein the error metric is a measure of a classification divergence between the combined set of classification data and the first classification set of data;

determining that the error metric is greater than an error threshold; and in response to the error metric being greater than the error threshold, determining that the entity associated with the set of input data is the malicious entity that is inducing the malicious shift of the trained current machine learning model toward the incorrect classifications; and responsive to the determining that the entity is the malicious entity:

retraining, by the computer, the updated current machine learning model by providing, as an input, the set of input data and the plurality of sets of classification data respectively produced by the plurality of previously generated machine learning models, thereby correcting the malicious shift of the updated current machine learning model, generating a retrained current machine learning model, and performing, by the computer, an action to prevent subsequent receipt of data associated with the entity so as to prevent a future input of data associated with the entity to at least the retrained current machine learning model, the action comprising at least one from among revoking the credential from the entity and blacklisting the entity.

2. The method of claim 1, wherein each of the plurality of previously generated machine learning models has an associated timestamp.

3. The method of claim 1, wherein the plurality of previously generated machine learning models are machine learning models created periodically over a period of one month or more.

4. The method of claim 1, further comprising:

retrieving, by the computer, the plurality of previously generated machine learning models from a model cache, wherein the plurality of previously generated machine learning models are selected from the model cache using a randomized sampling procedure.

5. The method of claim 1, wherein the trained current machine learning model and the plurality of previously generated machine learning models are associated with an entity profile.

6. The method of claim 1, wherein the trained current machine learning model is a neural network.

7. A computer comprising:

a processor; and a non-transitory computer readable medium coupled to the processor, the non-transitory computer readable medium comprising code that, when executed by the processor, causes the processor to perform a method including:

receiving a set of input data associated with an entity having a credential allowing the entity to communicate with the computer, applying as an input, the set of input data to a trained current machine learning model, in response to the input of the set of input data, producing, by the trained current machine learning model, a first set of classification data, updating the trained current machine learning model using the set of input data and the first set of classification data to generate an updated current machine learning model, determining first metadata corresponding to the trained current machine learning model before the updating, the first metadata corresponding to a metric or a characteristic of the trained current machine learning model before the updating, determining second metadata corresponding to the updated current machine learning model, the second metadata corresponding to a metric or a characteristic of the updated current machine learning model, analyzing the first metadata and the second metadata to determine a deviation metric, determining that the deviation metric is greater than a deviation threshold, in response to the deviation metric being greater than the deviation threshold:

applying the set of input data to a plurality of previously generated machine learning models, respectively, wherein the plurality of previously generated machine learning models do not include the updated current machine learning model, producing, by the plurality of previously generated machine learning models, a plurality of sets of classification data in response to respectively applying the set of input data to the plurality of previously generated machine learning models, determining whether the entity associated with the set of input data is a malicious entity attempting to induce a malicious shift of the trained current machine learning model toward incorrect classifications, the determining including:

combining the plurality of sets of classification data to produce a combined set of classification data, wherein both the combined set of classification data and the first classification set of data are produced for a same set of input data, analyzing the combined set of classification data and the first set of classification data to determine an error metric, wherein the error metric indicates a difference in (1) one or more classifications included in the first set of classification data produced by the updated current machine learning model and (2) classifications included in the combined set of classification data from the plurality of previously generated machine learning models, wherein the error metric is a measure of a classification divergence between the combined set of classification data and the first classification set of data, determining that the error metric is greater than an error threshold, and in response to the error metric being greater than the error threshold, determining that the entity associated with the set of input data is the malicious entity that is inducing the malicious shift of the trained current machine learning model toward the incorrect classifications, and responsive to the determining that the entity is the malicious entity:

retraining the updated current machine learning model by providing, as an input, the set of input data and the plurality of sets of classification data respectively produced by the plurality of previously generated machine learning models, thereby correcting the malicious shift of the updated current machine learning model, generating a retrained current machine learning model, and performing an action to prevent subsequent receipt of data associated with the entity so as to prevent a future input of data associated with the entity to at least the retrained current machine learning model, the action including at least one from among revoking the credential from the entity and blacklisting the entity.

8. The computer of claim 7, wherein each of the plurality of previously generated machine learning models has an associated timestamp.

9. The computer of claim 7, wherein the plurality of previously generated machine learning models are machine learning models created periodically over a period of one month or more.

10. The computer of claim 7, wherein the method further includes:

retrieving, by the computer, the plurality of previously generated machine learning models from a model cache, wherein the plurality of previously generated machine learning models are selected from the model cache using a randomized sampling procedure.

11. The computer of claim 7, wherein the trained current machine learning model and the plurality of previously generated machine learning models are associated with an entity profile.

* * * * *